Sept. 13, 1955  K. L. ANACKER  2,717,440
RIVET PIN CUTTERS
Filed Sept. 24, 1953
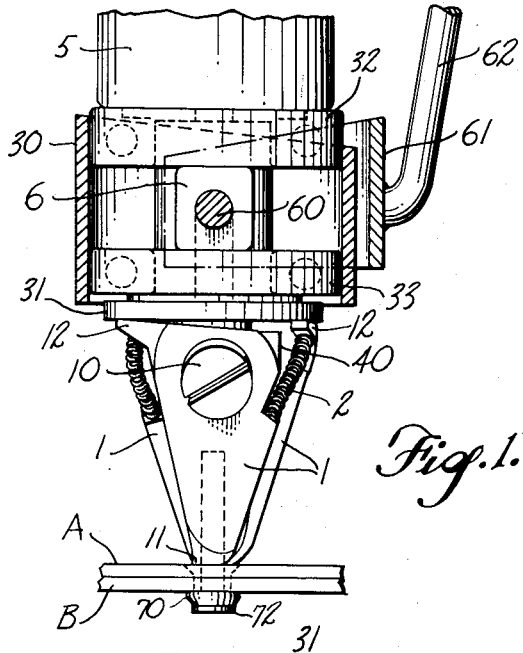
Fig. 1.
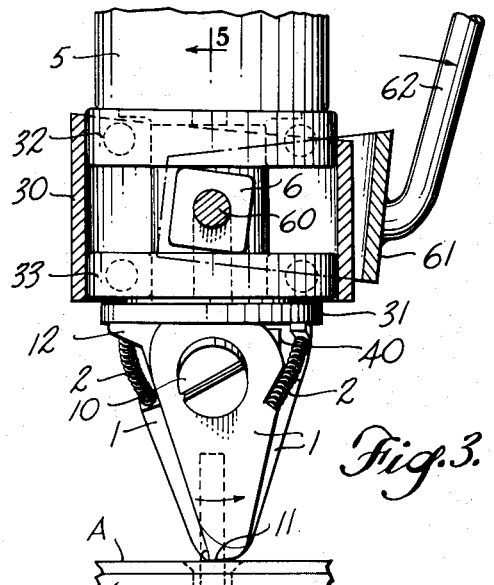
Fig. 3.
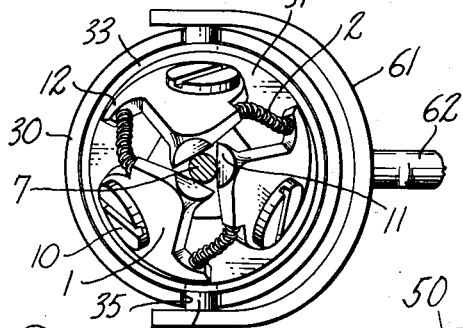
Fig. 2.
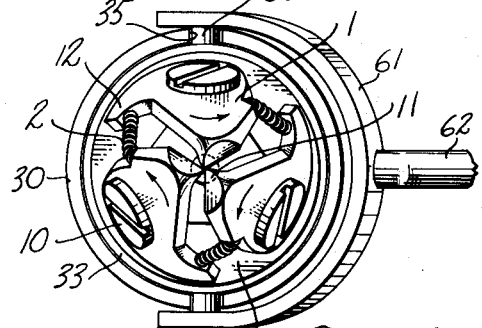
Fig. 4.
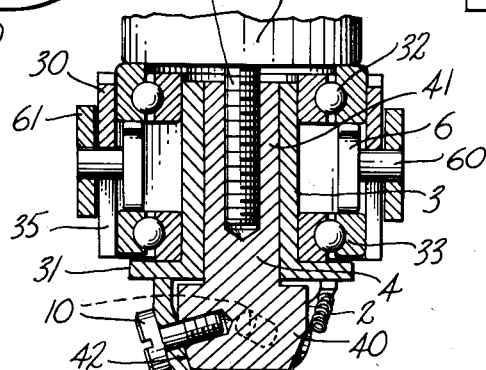
Fig. 5.
INVENTOR.
KENNETH L. ANACKER
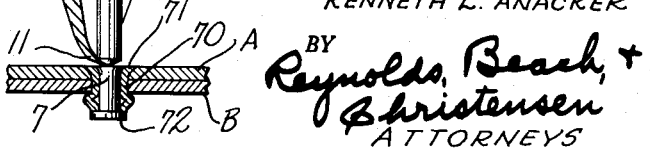
ATTORNEYS

United States Patent Office

2,717,440
Patented Sept. 13, 1955

2,717,440

RIVET PIN CUTTERS

Kenneth L. Anacker, Kirkland, Wash., assignor to Boeing Airplane Company, Seattle, Wash., a corporation of Delaware Application September 24, 1953, Serial No. 382,164

8 Claims. (Cl. 30—95)

Blind rivets are extensively used in aircraft construction, and commonly include an exteriorly headed hollow-shanked rivet and a pin having a head on its interior end that bears on the interior end of the rivet shank, and a shank which projects through the hollow shank of the rivet itself, to be engaged and drawn outwardly, whereby to expand the interior end of the hollow shank. There remains the exteriorly projecting end of the rivet pin, which must be broken off or cut off in some way, not only to leave the surface free from such obstructions but to avoid their drag effect in locations where they are exposed to the airstream. It is also desirable that the cut end of the rivet be peened in some manner in order to insure that it will not slip back into the interior of the aircraft structure, leaving a hole through the rivet which will permit entrance of moisture and dirt, and which in itself may add to the drag. Where the elimination of drag is of major importance, as it is in almost all exterior surfaces, it is highly desirable that the shank of the rivet pin be cut in such manner that it is precisely flush with the exterior surface of the riveted structure, and approximation, only, of that objective is virtually as objectionable as if the rivet pin were left uncut.

The present invention provides a tool by which these several objects may all be attained readily, simply, and quickly, without any large degree of skill on the part of the operator, and in particular without applying a stress to the structure which has been riveted, for while prior attempts have approached the aims indicated above, though have not attained them completely, such prior attempts have in all instances known to me applied undue stress to the riveted structure, tending to deform it, and it is a particular object of the present invention to accomplish the primary aims indicated without at the same time applying any appreciable stress to the riveted structure.

Likewise it is an object to provide a tool of this sort which may be employed in conjunction with a conventional electric drill or the like, to which the tool can be attached, so that the operation can be performed simply and quickly, by tool-driving means which are always readily available.

The invention comprises in effect a plurality of levers, each pivotally mounted in a particular manner upon a rotative supporting body, and each formed at a lower end with a combined pointed and chisel-like cutting element, the whole so organized and arranged that the several cutting elements, by pivoting, may simultaneously approach and meet in the axis of rotation, but may be swung laterally aside therefrom; when thus mutually swung aside they may embrace the protruding rivet pin symmetrically, and may then be urged inwardly during rotation, whereby to complete severance of the rivet pin as they reach the axis of rotation. The rotative action and the formation of the cutting elements are such that during rotation they peen the cut end of the rivet pin shank to insure its retention in the axial bore of the hollow rivet. Since the forces applicable to the rivet pin shank are directed almost wholly radially of its axis, and the forces directed axially of the rivet pin shank are substantially equally balanced and so are negligible, there is to all intents and purposes no force applied to the riveted structure. Since the cutting elements act at the extreme lower end of the tool, the severance of the rivet pin shank can be made to occur in the plane of the rivet's head, or if it be a flush head, then in the plane of the exterior surface of the riveted structure itself.

The invention will be best understood by reference to the accompanying drawings in which the invention is illustrated in a practicable form, such as is presently preferred by me.

Figure 1 is a side elevational view of the operating parts of the tool, certain of the parts and the riveted structure itself being shown in section for better illustration. Parts in this view are in the passive or initial starting position.

Figure 2 is an end elevation of the tool, with the parts in the position in which they are shown in Figure 1.

Figure 3 is a view corresponding to Figure 1 but with the parts shown in the position they would assume substantially at the conclusion of the pin-cutting operation.

Figure 4 is a view corresponding to Figure 2, but showing parts in the positions corresponding to Figure 3.

Figure 5 is an axial sectional view on the plane indicated by the line 5—5 of Figure 3.

A rotative supporting body 4 is formed with an enlarged head 40 and with a stem 41, the latter being arranged for driving engagement with the rotative shaft of an electric drill or the like. The lower end of the drill housing is represented at 5, and the interconnection between them is represented by the screw-threaded stem 50, screwed within a threaded axial bore in the stem 41 of the tool. The particular manner of connection to the drill is immaterial to the present invention, and that shown is intended as typical only.

For convenience of reference, the head 40 of the rotative supporting body 4 will be described as its lower end. This lower end is exteriorly provided with several flat portions 42 which are inclined somewhat with respect to the axis of rotation. These several flats 42 are spaced equally or symmetrically about the axis of the head 40, and on each thereof is pivotally mounted a lever 1. In the tool illustrated there are three such levers. It is possible to use only two, but the use of three is preferred since it affords the possibility of bracketing the rivet pin with complete equalization of forces, later described, directed radially inwardly of the pin's axis. More than three levers may be used, also, but again the use of three assures equalization of forces, whereas four would not, in the same automatic sense. Moreover, the tool is small, and there is not room for a large number.

Each such lever is pivotally mounted, as by a pivot bolt 10, the axis of which is directed more or less radially of the rotative axis, and normal to the flattened portion 42 of the head on which the lever is pivoted, but which by reason of the inclination of the flat 42 is caused to assume a slight inclination with respect to a plane normal to the rotative axis of the supporting body 4. All such pivot bolts are inclined in the same direction with respect to that axis, and of course all such pins are equally or symmetrically spaced about the rotative axis. Except for their inclination they are preferably normal to that axis.

The levers 1 are in effect bell crank levers, having a downwardly directed pointed end terminating in a chisel-like cutting element 11. The upper end of each lever is directed laterally from the pivot bolt at 10, and terminates in a heel 12. The heels of the several levers are directed all in the same rotative sense. The shape of each lever is such, with respect to the angle of inclination of the pivot bolt 10 relative to the rotative axis, that the lowermost tip of its cutting element 11 may exacly reach or pass through the rotative axis of the supporting body 4, but may also be swung aside laterally from that rotative axis. In Figure 4 the cutting elements are shown at the instant they arrive at coincidence with the rotative axis, whereas in Figure 2 these cutting points are shown in their swung-aside position. The formation of the cutting element is such as to provide a chisel-like edge, that shown in contact with the shank 5 of the rivet pin, and with a downwardly facing flat surface which, as will be shown later, acts to peen the cut end of the rivet pin.

The several levers 1 are normally held resiliently in their outwardly swung or separated position, to which end any convenient resiliently yieldable means such as the tension springs 2 may be used. Such springs may be engaged in any suitable manner with the individual levers 1, as, for example, by securing their opposite ends to the heel 12 of one lever and to the facing edge of the next lever.

In order to urge the levers in opposition to the springs 2 so as to swing their cutting elements 11 inwardly from the outswing position of Figure 2 to the final position of Figure 4, a force is applied to the upper end of each such lever at the heel 12. This force should be applied equally and simultaneously to all the levers. To that end a bushing 3 is mounted upon the stem 41 of the rotative supporting body 4, this bushing being preferably outwardly flanged at its lower end as indicated at 31. It will rotate with the rotative body 4, although no special means are provided to insure this other than the frictional engagement between them. However, in order to effect axially downward sliding movement of the bushing 3, and so to apply a force to the heels 12 of the levers, which contact the lower face of the flange 31, two combined rotative and thrust bearings are conveniently employed. The upper bearing 32 is in effect fixed against axial movement relative to the supporting body 4, to which end its outer race may bear against the lower end face of the drill housing 5, and the lower bearing 33 has its inner race bearing against the upper surface of the flange 31, or otherwise operatively connected to the bushing 3 to effect movement of the latter axially of the axis of rotation. The inner races of the two bearings, which are spaced somewhat widely apart, are free to rotate, and the outer races will remain non-rotative. All may be housed within a surrounding sleeve 30.

A cam-like element 6, which may be simply a square block, is interposed between the outer faces of the upper and lower bearings 32 and 33 within the sleeve 30. Two diametrically opposite cams are used, and they may be caused to tilt from the position of rest shown in Figure 1 to the active position shown in Figure 3. They may be caused to tilt by securing each to an inwardly directed stub shaft 60 entering through slots 35 in the sleeve 30, fixedly secured to the cams 6 and to a yoke 61 which embraces the sleeve 30 and which connects the two coaxial stub shafts 60 at the diametrically opposite sides of the tool. When the yoke 61 is tilted about the common axis defined by the stub shafts 60, the consequent rotational movement of the cams 6 will force the upper and lower bearings 32, 33 apart, and so will exert pressure on the flange 31, which in turn will urge the heels 12 downwardly and thereby produce an inwardly directed force on the swung-aside cutting points 11. Such tilting of the yoke 61 may be accomplished by means of an operating handle 62 moving in the direction of the arrow shown in Figure 3. The resultant movement of the levers 1 is likewise indicated by arrows in that figure and in Figure 4.

Two thin sheets A and B are shown in the drawings as secured together by a blind rivet, consisting of a hollow shank 70 having a flush head 71, the interior end of the hollow shank 70 being upsettable by means of outward urging of the shank 7 of the rivet pin, which latter has an interior head 72 bearing upon the inner end of the hollow shank 70. The riveting operation having been performed in the usual manner by pulling the exteriorly protruding portion of the shank 7 out- wardly while holding the head 71 against outward movement, it becomes necessary to sever the protruding end of the pin 7. The tool described above is applied to the protruding end of the shank 7, the jaws formed by the cutting elements 11 of the several levers being spread widely enough to slip over the end of the rivet pin, and these cutting elements are brought into contact with the head 71 of the rivet. There is no need to press with any particular force against the head 71, merely to place the cutting elements 11 in contact therewith. Parts are then in the positions shown in Figures 1 and 2.

The rotation of the tool is begun, and at the same time the operating lever 62 is swung in a manner already described to urge the cutting elements 11 inwardly, whereupon their chisel-like inner edges begin to sever the rivet. Their cut is somewhat V-shaped, as seen in Figure 5, and any downward pressure is more than equalized by an accompanying upward reaction. Moreover, the downwardly facing flat surfaces of the cutting elements 11 tend to peen the embedded portion of the pin 7, and this insures its retention within the shank 70. As the cutting operation proceeds, the points of the cutting elements 11 eventually swing inwardly about their respective pivot axes defined by the several bolts 10, until finally the points of the cutting elements 11 arrive simultaneously at the rotative axis of the tool, that is to say, parts are in the position shown in Figures 3 and 4. When this stage is reached, the exteriorly protruding portion 7' of the rivet pin is severed and drops off, leaving the cut end of the rivet pin 7 smoothly polished and flush with the head 71 of the rivet, and if that is a flush head, then flush with the exterior surface of the sheet A of the riveted structure. Throughout the operation the forces applied to the rivet pin and to the riveted structure are almost solely in the direction of the plane of the riveted structure and radially of the rivet pin, inwardly from three symmetrically spaced directions, and consequently there is no tendency to deform the riveted structure nor any cause to back up the same, which would be impossible in places where blind rivets are employed.

I claim as my invention:

1. A tool for cutting the rivet pin of a blind rivet flush with the exterior end of the rivet's head, and for like purposes, comprising a rotative supporting body, a plurality of levers pivotally mounted thereon to swing about pivot axes directed generally radially of the axis of rotation and spaced thereabout, but inclined with respect to a plane normal to that axis, each such lever being formed at its lower end with a cutting element, and being of such shape and length, with respect to the inclination of its pivot axis, that its cutting element in pivoting can pass transversely through the axis of rotation, and means to exert a force upon the opposite end of all said levers, during rotation, in a direction to urge their respective cutting elements about their pivot axes from a laterally swung-aside position towards the axis of rotation.

2. A tool as and for the purposes indicated in claim 1, and resiliently yieldable means to retain the levers normally in the laterally swung-aside position.

3. A tool as and for the purposes indicated in claim 1, wherein the pressure-exerting means includes a bushing carried by and slidable axially along said rotative body, and bearing upon the respective levers at the ends opposite the cutting element, means carried by said bushing for engagement to move it axially, a reaction member immovable axially with respect to the supporting body and spaced axially from said bushing-carried means, and means reacting from said reaction member upon said bushing-carried means, to shift the bushing axially, and so to exert pressure upon said levers.

4. A tool as and for the purposes indicated in claim 1, wherein the cutting elements are each formed with a chisel-like cutting edge directed inwardly towards the axis of rotation and generally transverse to that axis when parts are in the swung-aside position, whereby to cut an annular V-notch in the rivet pin shank when urged inwardly, and each such cutting edge terminating in a cutting point which, by the swinging of the several levers each on its pivot axis, is swung into coincidence with all other such points as each point reaches the rotative axis.

5. A tool for cutting the rivet pin of a blind rivet flush with the exterior end of the rivet's head, and for like purposes, comprising a rotative supporting body, three levers pivotally mounted thereon to swing about respective pivot axes directed generally radially of and symmetrically spaced about the axis of rotation, but inclined alike with respect to a plane normal to that axis, each such lever being formed at its lower end with a pointed cutting element, and being of such length and shape otherwise, with respect to the inclination of its pivot axis, that in pivoting its cutting element can swing from a laterally swung-aside position inwardly to the axis of rotation, and means to exert pressure upon the opposite end of all said levers, during rotation, to urge their respective cutting elements thus inwardly, all simultaneously.

6. A tool for cutting the rivet pin of a blind rivet flush with the exterior end of the rivet's head, and for like purposes, comprising a rotative supporting body, three bell-crank levers pivotally mounted thereon to swing about respective pivot axes directed generally radially of and equally spaced about the axis of rotation, but inclined alike with respect to a plane normal to that axis, each such lever being formed to define a lower end depending below the supporting body and terminating in a pointed cutting element, and a laterally extending upper end directed in all instances in the same rotative sense and terminating in a pressure-receiving heel, each lever's lower end being of such length and shape, relative to the inclination of its pivot axis, that in pivoting its cutting element can swing from a laterally swung-aside position inwardly to the axis of rotation, resiliently yieldable means to retain the several levers normally in their respective swung-aside positions, a flanged bushing carried by and slidable axially along said rotative body, with its flange bearing upon the heels of the respective levers, and means operative during rotation to urge said bushing axially towards said levers, and so to exert pressure upon the levers' upper ends, to swing their lower ends inwardly in opposition to said resiliently yieldable means.

7. A tool as and for the purposes indicated in claim 6, including two combined rotative and thrust bearings surrounding and spaced axially of said bushing, tiltable cams interposed between said bearings and operative by tilting to urge the bearings apart from a position of closest approach, the upper bearing being axially fixed with relation to said suporting body, and the lower bearing engaging the bushing's flange, and means to tilt said cams to urge the bearings apart, the whole constituting the means to urge the bushing axially.

8. A tool as and for the purpose indicated in claim 7, including a sleeve surrounding said bearings, a yoke pivotally mounted on said sleeve to tilt about an axis normal to the rotative axis, the cams being tiltable about that axis and being secured to said yoke to be tilted thereby, and a tilting arm carried by said yoke extending generally in a direction parallel to the rotative axis, the whole constituting the means for tilting said yoke and cams.

References Cited in the file of this patent
UNITED STATES PATENTS

| | | |
|---|---|---|
| 2,371,423 | Buchet | Mar. 13, 1945 |
| 2,526,955 | Kugler | Oct. 24, 1950 |